US012761411B2

(12) United States Patent
Zheng

(10) Patent No.: US 12,761,411 B2
(45) Date of Patent: Oct. 13, 2026

(54) GRATING AND OPTICAL DEVICE

(71) Applicant: GUANGDONG OPPO MOBILE TELECOMMUNICATIONS CORP., LTD., Dongguan (CN)

(72) Inventor: Guang Zheng, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 535 days.

(21) Appl. No.: 18/362,567

(22) Filed: Jul. 31, 2023

(65) Prior Publication Data

US 2024/0019616 A1 Jan. 18, 2024

Related U.S. Application Data

(63) Continuation of application No. PCT/CN2022/071848, filed on Jan. 13, 2022.

(30) Foreign Application Priority Data

Feb. 9, 2021 (CN) ......................... 202110177022.5

(51) Int. Cl.
*G02B 5/18* (2006.01)
*G02B 27/01* (2006.01)

(52) U.S. Cl.
CPC ....... *G02B 5/1866* (2013.01); *G02B 27/0172* (2013.01); *G02B 2027/0178* (2013.01)

(58) Field of Classification Search
CPC .............. G02B 5/1866; G02B 27/0172; G02B 2027/0178; G02B 27/4205

(Continued)

(56) References Cited

U.S. PATENT DOCUMENTS

2005/0270647 A1* 12/2005 Polack ...................... G01J 3/18 359/567
2015/0253570 A1* 9/2015 Sunnari ................ G02B 6/0016 359/576

(Continued)

FOREIGN PATENT DOCUMENTS

CN 101548214 9/2009
CN 101548214 A * 9/2009 ........... E04G 21/246

(Continued)

OTHER PUBLICATIONS

WIPO, International Search Report and Written Opinion for International Application No. PCT/CN2022/071848, Apr. 8, 2022.

(Continued)

*Primary Examiner* — William R Alexander
*Assistant Examiner* — Alaina Marie Swanson
(74) *Attorney, Agent, or Firm* — Hodgson Russ LLP

(57) ABSTRACT

A grating and an optical device are provided. The grating at least includes a first grating layer and a second grating layer. The first grating layer includes first grating portions and second grating portions that are alternately arranged at regular intervals. A refractive index of each of the first grating portions is greater than a refractive index of each of the second grating portions. The second grating layer is disposed at one side of the first grating layer. The second grating layer includes third grating portions and fourth grating portions that are alternately arranged at regular intervals. A refractive index of each of the third grating portions is greater than a refractive index of each of the fourth grating portions. At least part of each of the third grating portions is aligned with each of the first grating portions.

15 Claims, 14 Drawing Sheets

(58) Field of Classification Search
USPC .......................................................... 359/566
See application file for complete search history.

(56) References Cited

U.S. PATENT DOCUMENTS

| | | | | |
|---|---|---|---|---|
| 2019/0369309 | A1 | 12/2019 | Jacob et al. | |
| 2020/0041791 | A1 * | 2/2020 | Shipton ............. | G02B 27/0172 |

FOREIGN PATENT DOCUMENTS

| | | | |
|---|---|---|---|
| CN | 104956148 | | 9/2015 |
| CN | 108387960 | | 8/2018 |
| EP | 1767964 | | 3/2007 |
| JP | 2008257771 | | 10/2008 |
| JP | 2017004004 | | 1/2017 |
| JP | 2018146624 | | 9/2018 |
| JP | 2018146624 | A * | 9/2018 |

OTHER PUBLICATIONS

CNIPA, Decision of Rejection for CN Application No. 202110177022.5, Apr. 1, 2023.
CNIPA, First Office Action ior CN Application No. 202110177022.5, Jul. 27, 2022.
CNIPA, Second Office Action for CN Application No. 202110177022.5, Dec. 13, 2022.
EPO, Extended European Search Report for EP Application No. 22752074.9, Jun. 27, 2024.
EPO, Communication for EP Application No. 22752074.9, Jul. 15, 2026.

* cited by examiner

GRATING AND OPTICAL DEVICE

CROSS-REFERENCE TO RELATED APPLICATIONS

This application is a continuation of International Application No. PCT/CN2022/071848, filed Jan. 13, 2022, which claims priority to Chinese Patent Application No. 202110177022.5, filed Feb. 9, 2021, the entire disclosures of which are hereby incorporated by reference.

TECHNICAL FIELD

This disclosure relates to the field of optical technology, and in particular, to a grating and an optical device.

BACKGROUND

With development of technologies, augmented reality (AR) display devices, such as AR glasses, can not only see external real world, but also need to see virtual images. A real scene and virtual information are fused to reinforce each other and "enhance" each other. However, when a user uses the AR display device, for example, when wearing the AR glasses, external ambient light is dispersed by an out-coupling grating in the AR glasses into a rainbow pattern, and light dispersed enters eyes of the user, such that the user sees the rainbow pattern, and this phenomenon is called a rainbow effect. When the user sees the rainbow pattern, user experience is affected at the very least, and the eyes of the user are hurt in severe cases.

SUMMARY

In a first aspect, a grating is provided in implementation of the present disclosure. The grating at least includes a first grating layer and a second grating layer. The first grating layer includes first grating portions and second grating portions that are alternately arranged at regular intervals. A refractive index of each of the first grating portions is greater than a refractive index of each of the second grating portions. A cross-sectional shape of each of the first grating portions is a first trapezoid. The second grating layer is disposed at one side of the first grating layer. The second grating layer includes third grating portions and fourth grating portions that are alternately arranged at regular intervals. A refractive index of each of the third grating portions is greater than a refractive index of each of the fourth grating portions. At least part of each of the third grating portions is aligned with each of the first grating portions. A cross-sectional shape of each of the third grating portions is a second trapezoid. A long base of the second trapezoid is away from the first grating portions.

In a second aspect, a grating is provided in implementations of the present disclosure. The grating at least includes a first grating layer and a second grating layer. The first grating layer is configured to diffract light to obtain first diffracted light. The second grating layer is disposed at one side of the first grating layer and configured to diffract the light to obtain second diffracted light. A phase difference P between the second diffracted light and the first diffracted light satisfies: $(2N+1)\pi-\pi/2 \leq P \leq (2N+1)\pi+\pi/2$, where $N \geq 0$ and N is an integer.

In a third aspect, an optical device is provided in implementations of the present disclosure. The optical device includes a polarizer and a grating. The grating is disposed at one side of the polarizer. The first grating layer is farther away from the polarizer than the second grating layer. A polarization state of the polarizer is a transverse magnetic (TM) polarization state. The grating at least includes a first grating layer and a second grating layer. The first grating layer includes first grating portions and second grating portions that are alternately arranged at regular intervals. A refractive index of each of the first grating portions is greater than a refractive index of each of the second grating portions. A cross-sectional shape of each of the first grating portions is a first trapezoid. The second grating layer is disposed at one side of the first grating layer. The second grating layer includes third grating portions and fourth grating portions that are alternately arranged at regular intervals. A refractive index of each of the third grating portions is greater than a refractive index of each of the fourth grating portions. At least part of each of the third grating portions is aligned with each of the first grating portions. A cross-sectional shape of each of the third grating portions is a second trapezoid. A long base of the second trapezoid is away from the first grating portions.

Other features and aspects of the disclosed features will become apparent from the following detailed description, taken in conjunction with the accompanying drawings, which illustrate, by way of example, the features in accordance with embodiments of the disclosure. The summary is not intended to limit the scope of any embodiments described herein.

DETAILED DESCRIPTION

Figure 1:
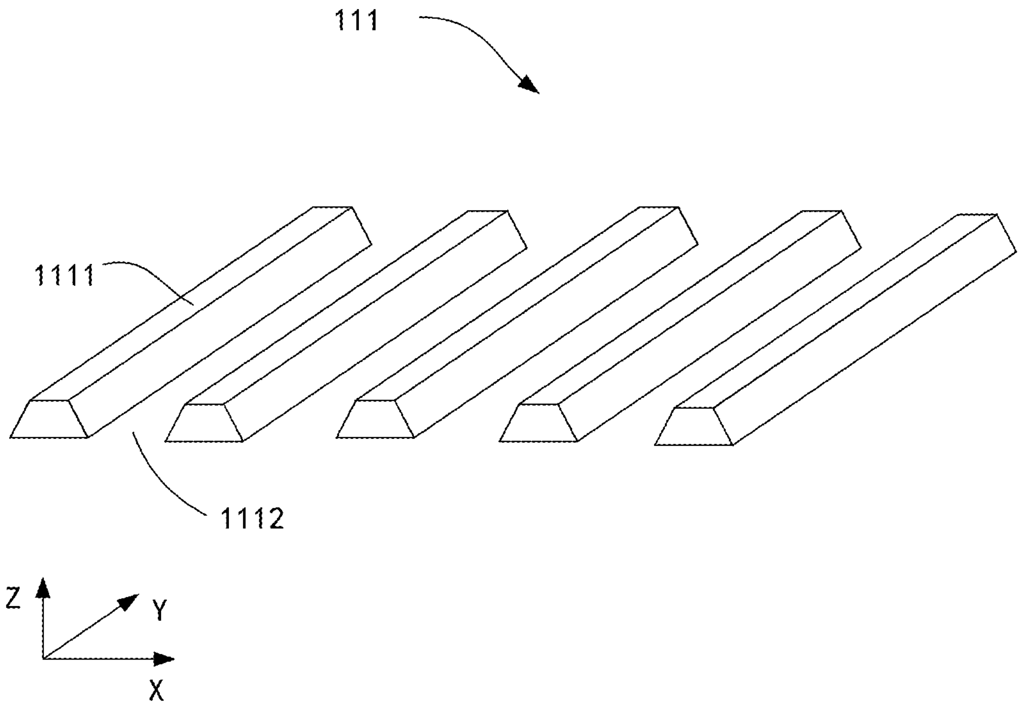
FIG. 1 is a schematic structural perspective diagram of a first grating layer in a grating provided in an implementation of the present disclosure.

In a first aspect, a grating is provided in implementation of the present disclosure. The grating at least includes a first grating layer and a second grating layer. The first grating layer includes first grating portions and second grating portions that are alternately arranged at regular intervals. A refractive index of each of the first grating portions is greater than a refractive index of each of the second grating portions. A cross-sectional shape of each of the first grating portions is a first trapezoid. The second grating layer is disposed at one side of the first grating layer. The second grating layer includes third grating portions and fourth grating portions that are alternately arranged at regular intervals. A refractive index of each of the third grating portions is greater than a refractive index of each of the fourth grating portions. At least part of each of the third grating portions is aligned with each of the first grating portions. A cross-sectional shape of each of the third grating portions is a second trapezoid. A long base of the second trapezoid is away from the first grating portions.

In implementations, the first grating layer is attached and fixed to the second grating layer.

In implementations, the refractive index of each of the first grating portions ranges from 1.4 to 3.0. The refractive index of each of the second grating portions ranges from 1.0 to 2.0. The refractive index of each of the third grating portions ranges from 1.4 to 3.0. The refractive index of each of the fourth grating portions ranges from 1.0 to 2.0.

In implementations, for each of the second grating portions and each of the fourth grating portions, at least one of the second grating portion or the fourth grating portion is air.

In implementations, the grating further includes a carrier substrate. The first grating layer and the second grating layer are fixed to the carrier substrate, and are arranged at opposite sides of the carrier substrate.

In implementations, the first trapezoid and the second trapezoid each are an isosceles trapezoid. At least one of an angle between a long base of the first trapezoid and a leg of the first trapezoid or an angle between the long base of the second trapezoid and a leg of the second trapezoid is greater than 80°.

In implementations, an orthographic projection of an endpoint of a long base of the first trapezoid on a plane where the long base of the second trapezoid is located is completely coincident with an endpoint of the long base of the second trapezoid adjacent to the first trapezoid.

In implementations, an orthographic projection of a long base of the first trapezoid on a plane where the long base of the second trapezoid is located at least partially overlaps the long base of the second trapezoid; or the orthographic projection of the long base of the first trapezoid on the plane where the long base of the second trapezoid is located is spaced apart from the long base of the second trapezoid.

In implementations, a height of the first grating layer ranges from 10 nm to 1 um, and a height of the second grating layer ranges from 10 nm to 1 um.

In implementations, an interval of the first grating layer is identical to an interval of the second grating layer, the interval of the first grating layer ranges from 300 nm to 600 nm, and the interval of the second grating layer ranges from 300 nm to 600 nm.

In implementations, the grating includes multiple first grating layers and multiple second grating layers that are alternately arranged at regular intervals.

In a second aspect, a grating is provided in implementations of the present disclosure. The grating at least includes a first grating layer and a second grating layer. The first grating layer is configured to diffract light to obtain first diffracted light. The second grating layer is disposed at one side of the first grating layer and configured to diffract the light to obtain second diffracted light. A phase difference P between the second diffracted light and the first diffracted light satisfies: $(2N+1)\pi-\pi/2\leq P\leq(2N+1)\pi+\pi/2$, where $N\geq 0$ and N is an integer.

In implementations, the first grating layer includes first grating portions and second grating portions that are alternately arranged at regular intervals. A refractive index of each of the first grating portions is greater than a refractive index of each of the second grating portions. A cross-sectional shape of each of the first grating portions is a first trapezoid. The second grating layer includes third grating portions and fourth grating portions that are alternately arranged at regular intervals. A refractive index of each of the third grating portions is greater than a refractive index of each of the fourth grating portions. At least part of each of the third grating portions is aligned with each of the first grating portions. A cross-sectional shape of each of the third grating portions is a second trapezoid. A long base of the second trapezoid is away from the first grating portions.

In implementations, the refractive index of each of the first grating portions ranges from 1.4 to 3.0. The refractive index of each of the second grating portions ranges from 1.0 to 2.0. The refractive index of each of the third grating portions ranges from 1.4 to 3.0. The refractive index of each of the fourth grating portions ranges from 1.0 to 2.0.

In implementations, a height of the first grating layer ranges from 10 nm to 1 um, and a height of the second grating layer ranges from 10 nm to 1 um.

In implementations, an interval of the first grating layer is identical to an interval of the second grating layer, the interval of the first grating layer ranges from 300 nm to 600 nm, and the interval of the second grating layer ranges from 300 nm to 600 nm.

In a third aspect, an optical device is provided in implementations of the present disclosure. The optical device includes a polarizer and the grating in the first aspect or the second aspect. The grating is disposed at one side of the polarizer. The first grating layer is farther away from the polarizer than the second grating layer. A polarization state of the polarizer is a transverse magnetic (TM) polarization state.

In implementations, a size of the polarizer is greater than or equal to a size of the grating, and an orthographic projection of the grating on the polarizer falls into the polarizer.

In a fourth aspect, an augmented reality (AR) display device is provided in implementations of the present disclosure. The AR display device includes the grating in the first aspect or the second aspect, or the optical device in the third aspect. The grating is an out-coupling grating in the AR display device.

In implementations, the AR display device further includes a wearable rim. The wearable rim has two window regions spaced apart from each other. The out-coupling grating is disposed in at least one window region in the two window regions.

Technical solutions of implementations of the present disclosure will be described clearly and completely with reference to accompanying drawings in implementations of the present disclosure. Apparently, implementations described herein are merely some implementations, rather than all implementations, of the present disclosure. Based on implementations of the present disclosure, all other implementations obtained by those of ordinary skill in the art without creative effort shall fall within the protection scope of the present disclosure.

It should be noted that the term "embodiment" or "implementation" referred to herein means that a particular feature, structure, or characteristic described in conjunction with the embodiment or implementation may be contained in at least one implementation of the present disclosure. The phrase "implementation" appearing in various places in the specification does not necessarily refer to the same implementation, nor does it refer to an independent or alternative implementation that is mutually exclusive with other implementations. It is expressly and implicitly understood by those skilled in the art that implementations described herein may be combined with other implementations.

The terms "first" and "second" appearing in the present disclosure are only used for a purpose of description, and cannot be understood as indicating or implying relative importance or implicitly indicating the number of indicated technical features. Thus, the features defined by "first" and "second" may explicitly or implicitly include one or more of the features. In the description of the present disclosure, "multiple" means two or more than two, unless specified otherwise.

Figure 2:
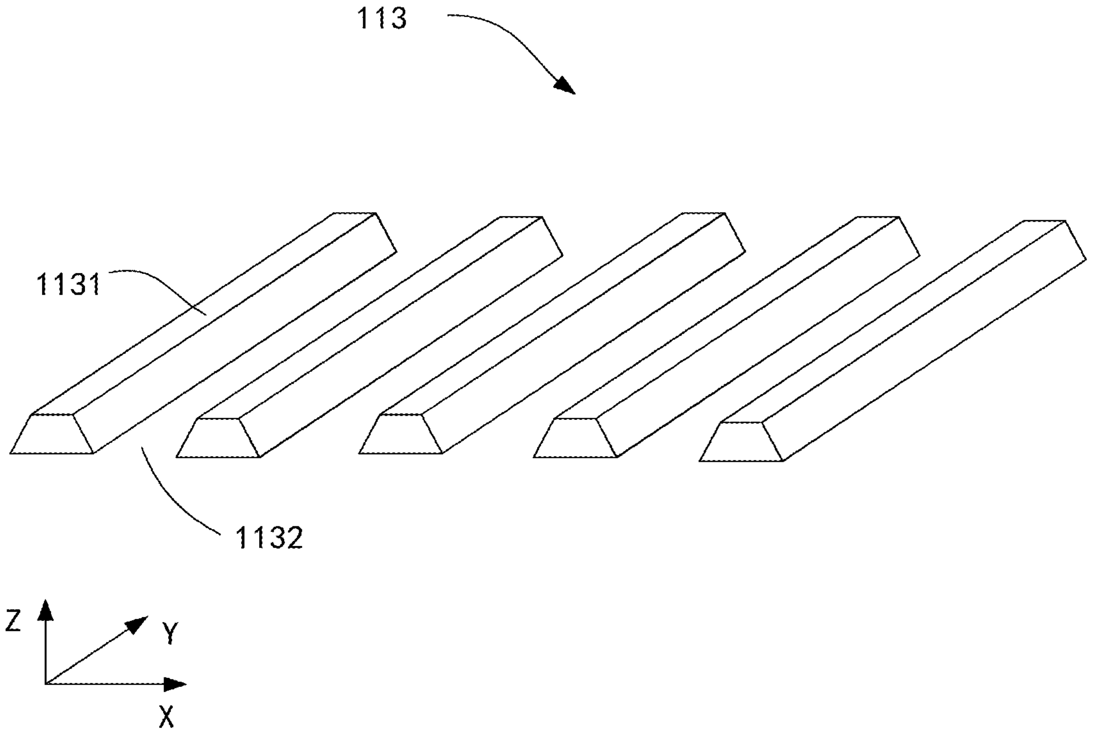
FIG. 2 is a schematic perspective diagram of a second grating layer in the grating in which the first grating layer is located provided in FIG. 1.
Figure 3:
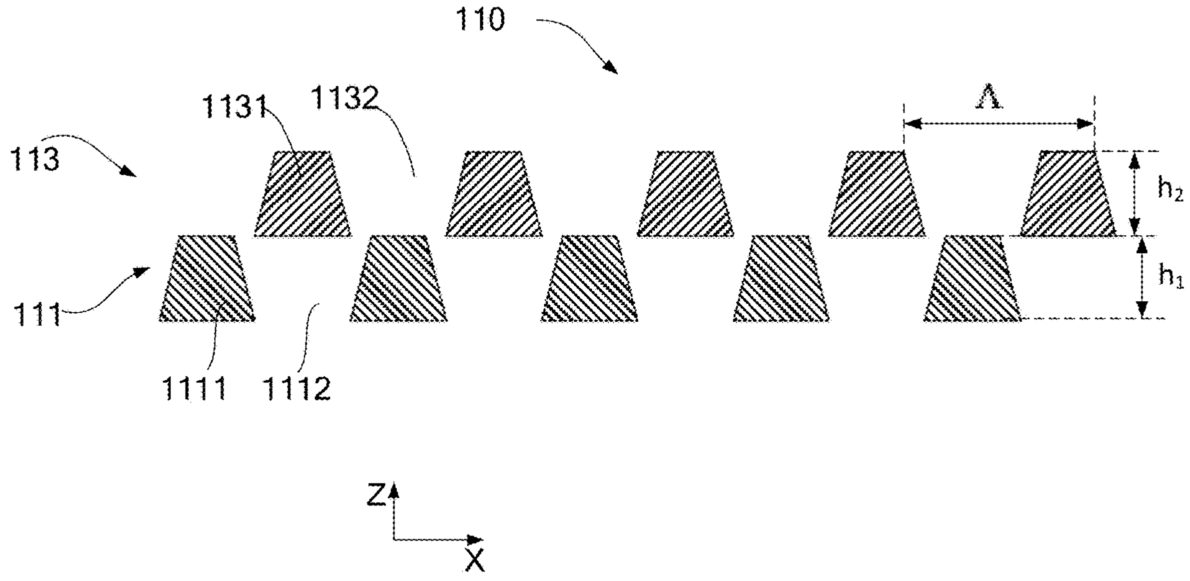
FIG. 3 is a side view of the grating that includes the first grating layer in FIG. 1 and the second grating layer in FIG. 2.
Figure 4:
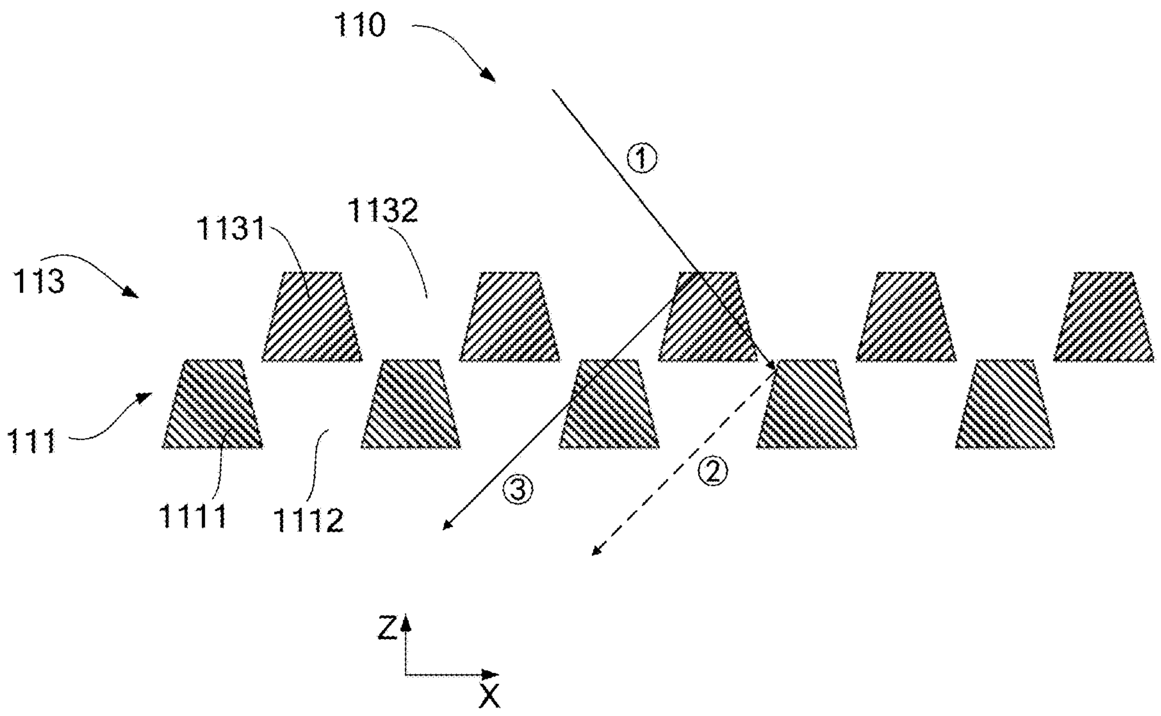
FIG. 4 is a schematic diagram illustrating an effect of the grating illustrated in FIG. 3 on light.

Referring to FIG. 1 to FIG. 4 together, FIG. 1 is a schematic structural perspective diagram of a first grating layer in a grating provided in an implementation of the present disclosure, FIG. 2 is a schematic perspective diagram of a second grating layer in the grating in which the first grating layer is located provided in FIG. 1, FIG. 3 is a side view of the grating that includes the first grating layer in FIG. 1 and the second grating layer in FIG. 2, and FIG. 4 is a schematic diagram illustrating an effect of the grating illustrated in FIG. 3 on light. The grating 110 at least includes a first grating layer 111 and a second grating layer 113. The first grating layer 111 is configured to diffract light to obtain first diffracted light. The second grating layer 113 is disposed at one side of the first grating layer 111 and configured to diffract the light to obtain second diffracted light. A phase difference P between the second diffracted light and the first diffracted light satisfies: $(2N+1)\pi-\pi/2\leq P\leq(2N+1)\pi+\pi/2$, where NO and N is an integer.

The first grating layer 111 and the second grating layer 113 may be spaced apart from each other, or the first grating layer 111 and the second grating layer 113 may be stacked with and attached to each other. In a schematic diagram in this implementation, for example, the first grating layer 111 and the second grating layer 113 are stacked with and attached to each other, and the grating 110 includes the first grating layer 111 and the second grating layer 113. In other implementations, the grating 110 may include other grating layers in addition to the first grating layer 111 and the second grating layer 113.

In FIG. 4, light incident to the grating 110 is represented by light ①, the first diffracted light is represented by light ②, and the second diffracted light is represented by light ③.

Figure 5:
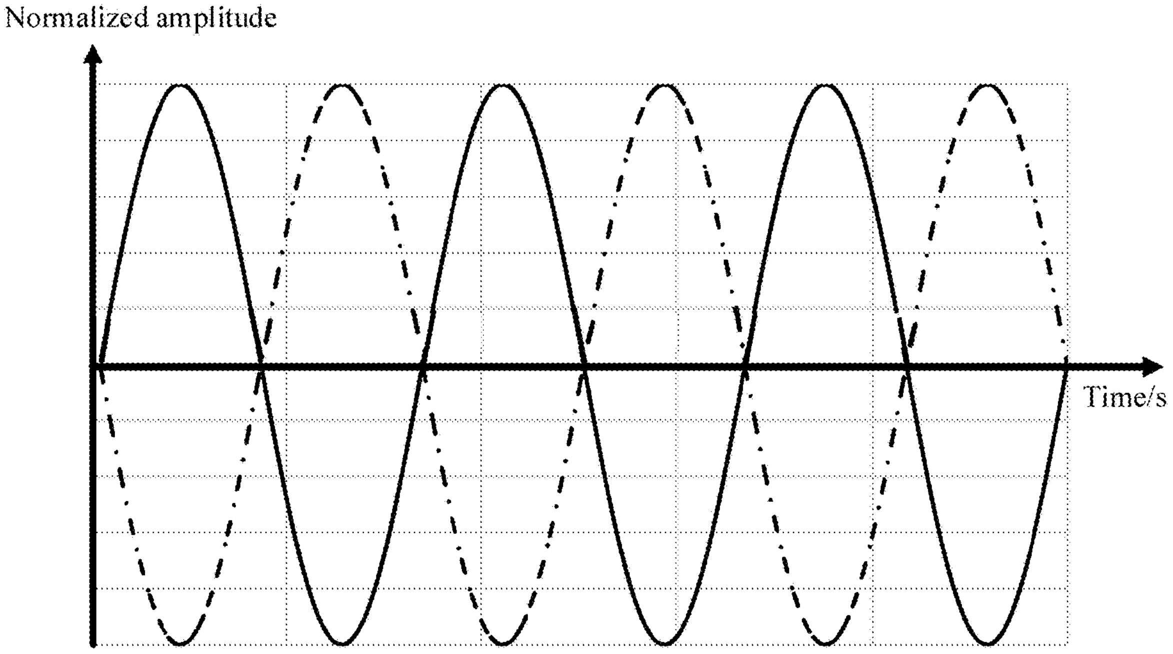
FIG. 5 is a schematic diagram illustrating time-dependent changes of a normalized amplitude of first diffracted light of the grating in FIG. 3 and time-dependent changes of a normalized amplitude of second diffracted light of the grating in FIG. 3.

Referring to FIG. 5, FIG. 5 is a schematic diagram illustrating time-dependent changes of a normalized amplitude of first diffracted light of the grating in FIG. 3 and time-dependent changes of a normalized amplitude of second diffracted light of the grating in FIG. 3. In FIG. 5, for example, simulation is performed with the phase difference of $(2N+1)\pi$ between the second diffracted light and the first diffracted light. The phase difference between the second diffracted light and the first diffracted light is $(2N+1)\pi$, that is, the phase difference between the second diffracted light and the first diffracted light is an odd multiple of $\pi$. In FIG. 5, an abscissa represents time in units of second, and an ordinate represents normalized amplitude in no unit. In FIG. 5, a solid line represents the first diffracted light, and a dotted line represents the second diffracted light. It can be seen from FIG. 5 that an amplitude of the first diffracted light is equal to an amplitude of the second diffracted light, a direction of the first diffracted light is opposite to a direction of the second diffracted light, and the phase difference between the first diffracted light and the second diffracted light is $(2N+1)\pi$. Therefore, when the first diffracted light and the second diffracted light are superimposed, a superimposition result is zero. In other words, the light entering the grating 110 is unable to be transmitted out of the grating 110 due to the first grating layer 111 and the second grating layer 113. Therefore, a rainbow pattern can be eliminated. When the grating 110 is applied to an AR display device 1, the rainbow pattern can be prevented from damaging eyes of a user wearing the AR display device 1.

When the phase difference between the second diffracted light and the first diffracted light is $(2N+1)\pi$, that is, when the phase difference between the second diffracted light and the first diffracted light is the odd multiple of $\pi$, since the amplitude of the first diffracted light is equal to the amplitude of the second diffracted light and the direction of the first diffracted light is opposite to the direction of the second diffracted light, the superimposition result of the first diffracted light and the second diffracted light is zero. In this case, the grating 110 has the best effect on eliminating the rainbow pattern.

When the phase difference P between the second diffracted light and the first diffracted light satisfies: $(2N+1)\pi-\pi/2\leq P\leq(2N+1)\pi+\pi/2$ and $P\neq(2N+1)\pi$, the first diffracted light and the second diffracted light can also be superimposed to cancel out part of the first diffracted light and part of the second diffracted light, but the rest of the first diffracted light and the rest of the second diffracted light will exit the grating 110, thereby forming the rainbow pattern. However, since the first diffracted light and the second diffracted light can also be superimposed to cancel out the part of the first diffracted light and the part of the second diffracted light, the energy of the rainbow pattern formed by the rest of the first diffracted light and the rest of the second diffracted light that exit the grating 110 is weakened, that is, the rainbow pattern is suppressed.

It can be seen from the above analysis that in the grating 110 provided in this implementation, by designing the first grating layer 111 and the second grating layer 113, the phase difference P between the second diffracted light and the first diffracted light satisfies: $(2N+1)\pi-\pi/2\leq P\leq(2N+1)\pi+\pi/2$, where $N\geq0$ and N is an integer, such that light that exits the grating 110 and the rainbow pattern generated when the light exits the grating 110 can be weakened or even completely eliminated. A specific structure of the grating 110 will be described in detail below with reference to the accompanying drawings.

Referring to FIG. 1 to FIG. 4, in this implementation, the first grating layer 111 includes first grating portions 1111 and second grating portions 1112 that are alternately arranged at regular intervals. A refractive index of each of the first grating portions 1111 is greater than a refractive index of each of the second grating portions 1112. A cross-sectional shape of each of the first grating portions 1111 is a first trapezoid. The second grating layer 113 includes third grating portions 1131 and fourth grating portions 1132 that are alternately arranged at regular intervals. A refractive index of each of the third grating portions 1131 is greater than a refractive index of each of the fourth grating portions 1132. At least part of each of the third grating portions 1131 is aligned with each of the first grating portions 1111. A cross-sectional shape of each of the third grating portions 1131 is a second trapezoid. A long base of the second trapezoid is away from the first grating portions 1111.

It should be noted that an extension direction of the first grating portion 1111, an extension direction of the second grating portion 1112, an extension direction of the third grating portion 1131, and an extension direction of the fourth grating portion 1132 are identical. In this implementation, for example, the extension direction is direction Y, the first grating layer 111 and the second grating layer 113 is stacked with other in direction Z, the first grating portions 1111 and the second grating portions 1112 in the first grating layer 111 are alternately arranged in direction X, and the third grating portions 1131 and the fourth grating portions 1132 in the second grating layer 113 are alternately arranged in direction X.

The first grating layer 111 and the second grating layer 113 form a double-layer grating structure, and the first grating layer 111 and the second grating layer 113 have identical intervals Λ. The grating 110 includes the first grating layer 111 and the second grating layer 113, and the first grating layer 111 includes the first grating portions 1111 and the second grating portions 1112 that are alternately arranged at regular intervals. The refractive index of the first grating portion 1111 is greater than the refractive index of the second grating portion 1112. For ease of description, the refractive index of the first grating portion 1111 is marked as n12, and the refractive index of the second grating portion 1112 is marked as n11; the refractive index of the third grating portion 1131 is marked as n22, and the refractive index of the fourth grating portion 1132 is marked as n21; and a refractive index of a medium at one side of the first grating layer 111 away from the second grating layer 113 is marked as n1, and a refractive index of a medium at one side of the second grating layer 113 away from the first grating layer 111 is marked as n2. In other words, the first grating layer 111 is composed of two types of grating portions alternately arranged with refractive indexes of n12 and n11; and the second grating layer 113 is composed of two types of grating portions alternately arranged with reflective indexes of n22 and n21. At least part of the third grating portion 1131 is aligned with the first grating portion 1111. In the schematic diagram in this implementation, for example, the third grating portion 1131 is aligned with the first grating portion 1111. In the grating 110 in the present disclosure, the first grating layer 111 and the second grating layer 113 are arranged to have a structure in which double-layer gratings are distributed in a staggered manner, and the above design can lead to the phase difference between the first grating layer 111 and the second grating layer 113. By designing a structure parameter of the first grating layer 111 and a structure parameter of the second grating layer 113, the phase difference P between the second diffracted light and the first diffracted light satisfies: $(2N+1)\pi-\pi/2\leq P\leq(2N+1)\pi+\pi/2$, such that completely coherent subtraction or partially coherent subtraction of the first diffracted light and the second diffracted light can be realized, and a rainbow effect can be further reduced or even eliminated.

Specifically, in an implementation, it can be designed that an interval of the first grating layer 111 is identical to an interval of the second grating layer 113. The interval Λ of the first grating layer ranges from 300 nm to 600 nm. The interval Λ of the second grating layer ranges from 300 nm to 600 nm.

Specifically, in an implementation, it can be designed that a height h1 of the first grating layer 111 ranges from 10 nm to 1 um. A height h2 of the second grating layer 113 ranges from 10 nm to 1 um. h1 may be equal to h2 or not.

Specifically, in an implementation, it can be designed that the refractive index of the first grating portion 1111 ranges from 1.4 to 3.0. The refractive index of the second grating portion 1112 ranges from 1.0 to 2.0. The refractive index of the third grating portion 1113 ranges from 1.4 to 3.0. The refractive index of the fourth grating portion 1114 ranges from 1.0 to 2.0.

In an implementation, the first grating portion 1111 may be made of a high-refractive-index material, such as hafnium oxide, titanium oxide, tantalum oxide, etc., and the refractive index of the high-refractive-index material may range from 1.7 to 3.0. The second grating portion 1112 may be made of a low-refractive-index material, such as air, silicon oxide, optical resin, etc., the refractive index of the low-refractive-index material may range from 1.0 to 2.0. Correspondingly, the third grating portion 1113 may be made of the high-refractive-index material, such as hafnium oxide, titanium oxide, tantalum oxide, etc., and the refractive index of the high-refractive-index material may range from 1.7 to 3.0. The fourth grating portion 1132 may be made of the low-refractive-index material, such as air, silicon oxide, optical resin, etc., and the refractive index of the low-refractive-index material may range from 1.0 to 2.0. Generally, when a difference between the refractive index n12 of the first grating portion 1111 and the refractive index n11 of the second grating portion 1112 is greater, an effect of avoiding the rainbow pattern is more obvious. Correspondingly, when a difference between the refractive index n22 of the third grating portion 1131 and the refractive index n21 of the fourth grating portion 1132 is greater, an effect of reducing or even avoiding the rainbow pattern is more obvious.

In the schematic diagram in this implementation, for example, the second grating portion 1112 and the fourth grating portion 1132 each are air. It can be understood that in other implementations, in the grating 110, the second grating portion 1112 is air, and the fourth grating portion 1132 is not air. Alternatively, in other implementations, the second grating portion 1112 is not air, and the fourth grating portion 1132 is air. In other words, at least one of the second grating portion 1112 or the fourth grating portion 1132 is air.

Figure 6:
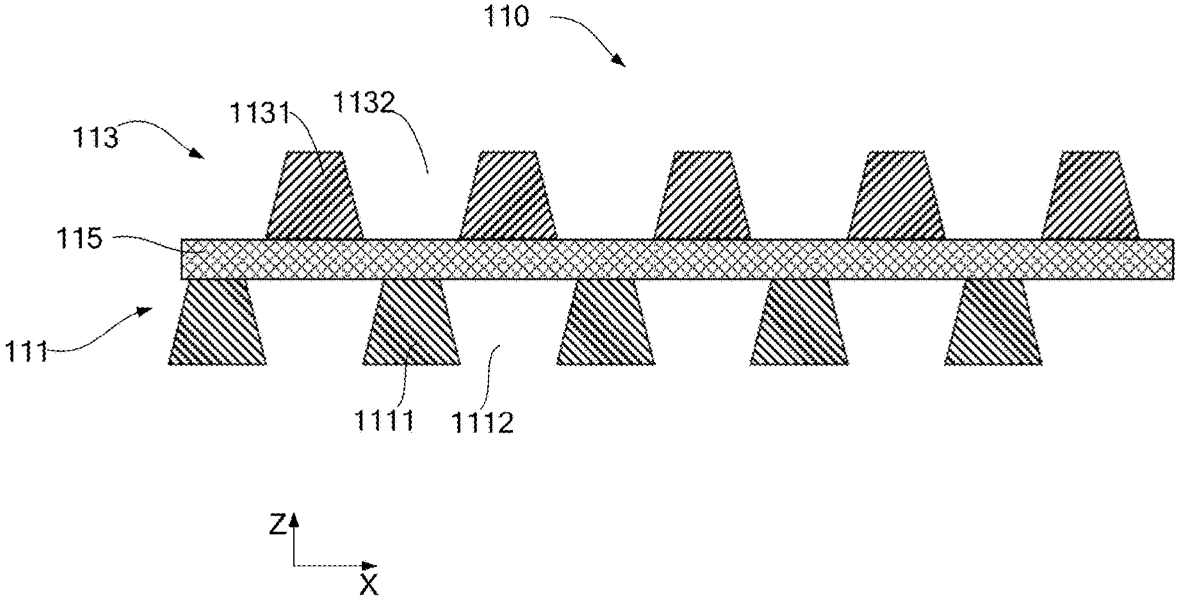
FIG. 6 is a schematic structural diagram of a grating provided in another implementation of the present disclosure.

Referring to FIG. 6, FIG. 6 is a schematic structural diagram of a grating provided in another implementation of the present disclosure. In this implementation, in addition to the first grating layer 111 and the second grating layer 113, the grating 110 further includes a carrier substrate 115. It can be understood that the carrier substrate 115 is transparent for allowing light to pass through. Please refer to the previous description for the first grating layer 111 and the second grating layer 113, which will not be repeated here. In this implementation, the first grating layer 111 and the second grating layer 113 are fixed to the carrier substrate 115, and are arranged at opposite sides of the carrier substrate 115. When the first grating layer 111 and the second grating layer 113 are fixed to the carrier substrate 115, the second grating portion 1112 may be air or not, and the fourth grating portion 1132 may be air or not. When the second grating portion 1112 is not air and the fourth grating portion 1132 is not air, that is, when the second grating portion 1112 is made of a media material and the fourth grating portion 1132 is made of a media material, the first grating layer 111 is attached and fixed to the second grating layer 113, such that the grating 110 has a relatively thin thickness. When at least one of the second grating portion 1112 or the fourth grating portion 1132 is air, and the first grating layer 111 and the second grating layer 113 are fixed to the carrier substrate 115, and are arranged at opposite sides of the carrier substrate 115, the grating 110 forms a relatively stable whole, which facilitates application of the grating 110.

Figure 7:
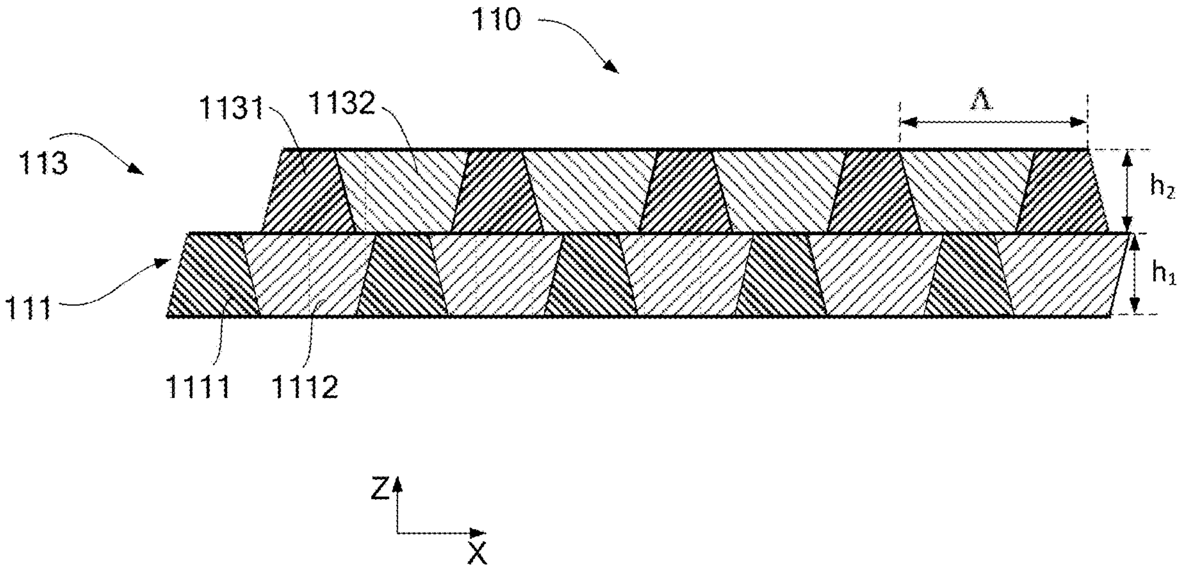
FIG. 7 is a schematic structural diagram of a grating provided in yet another implementation of the present disclosure.

Referring to FIG. 7, FIG. 7 is a schematic structural diagram of a grating provided in yet another implementation of the present disclosure. In this implementation, when the second grating portion 1112 is not air and the fourth grating portion 1132 is not air, that is, when the second grating portion 1112 is made of a media material and the fourth grating portion 1132 is made of a media material, the first grating layer 111 is attached and fixed to the second grating layer 113, such that the grating 110 has a relatively thin thickness.

Figure 8:
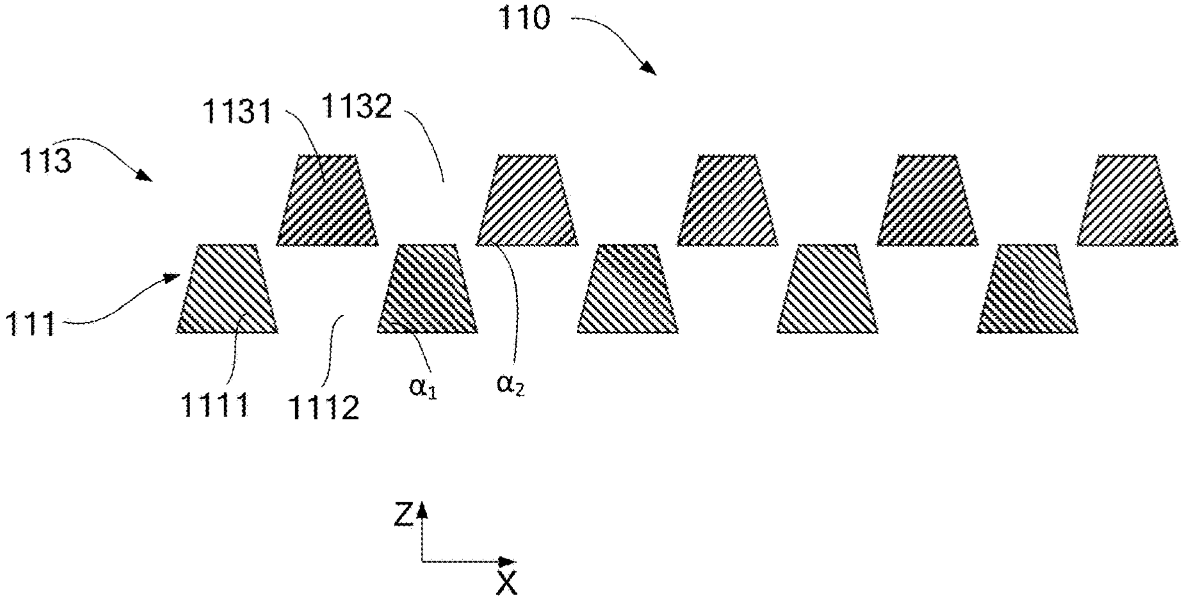
FIG. 8 is a schematic diagram illustrating sizes of components in the grating in FIG. 3.

Referring to FIG. 8, FIG. 8 is a schematic diagram illustrating sizes of components in the grating in FIG. 3. In this implementation, the first trapezoid and the second trapezoid each are an isosceles trapezoid. At least one of an angle $\alpha 1$ between a long base of the first trapezoid and a leg of the first trapezoid or an angle $\alpha 2$ between the long base of the second trapezoid and a leg of the second trapezoid is greater than 80°.

The first trapezoid and the second trapezoid each are the isosceles trapezoid, and with the above design of the first trapezoid and the second trapezoid, an effect of coherent subtraction of the first diffracted light and the second diffracted light can be relatively great. In addition, with the above design of the first trapezoid and the second trapezoid, the first grating layer 111 and the second grating layer 113 are easier to be manufactured. It should be noted that in other implementations, the first trapezoid may also not be the isosceles trapezoid, and the second trapezoid may also not be the isosceles trapezoid, as long as the first grating layer 111 and the second grating layer 113 are able to realize at least partially coherent subtraction of the first diffracted light and the second diffracted light.

Figure 9:
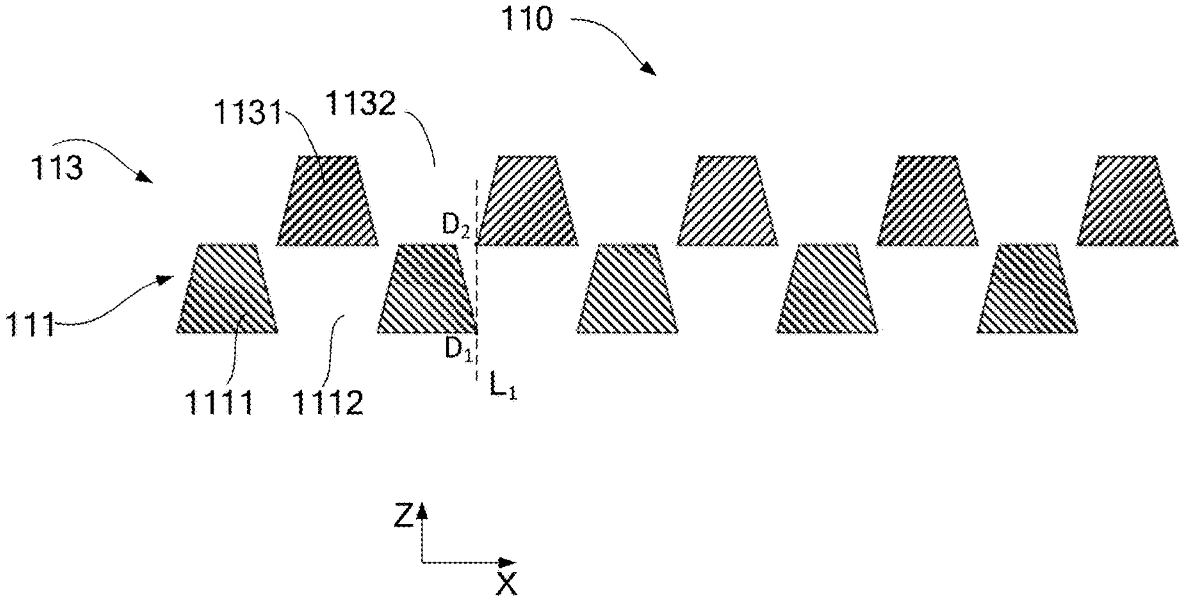
FIG. 9 is a schematic diagram illustrating relationships among components in the grating in FIG. 3.

Referring to FIG. 9, FIG. 9 is a schematic diagram illustrating relationships among components in the grating in FIG. 3. An orthographic projection of an endpoint of a long base of the first trapezoid on a plane where the long base of the second trapezoid is located is completely coincident with an endpoint of the long base of the second trapezoid adjacent to the first trapezoid.

The endpoint of the long base of the first trapezoid is named as an endpoint D1, and the endpoint of the long base of the second trapezoid adjacent to the first trapezoid is named as an endpoint D2. The orthographic projection of the endpoint of the long base of the first trapezoid on the plane where the long base of the second trapezoid is located is completely coincident with the endpoint of the long base of the second trapezoid adjacent to the first trapezoid, and in other words, an orthographic projection of the endpoint D1 on the plane where the long base of the second trapezoid is located is completely coincident with the endpoint D2. Here, a connecting line L1 between the endpoint D1 and the endpoint D2 is perpendicular to the long base of the first trapezoid and perpendicular to the long base of the second trapezoid. In this implementation, with the above design of the grating 110, the first diffracted light and the second diffracted light can have a relatively great effect of coherent subtraction, such that the rainbow effect can be further reduced or even avoided.

Figure 10:
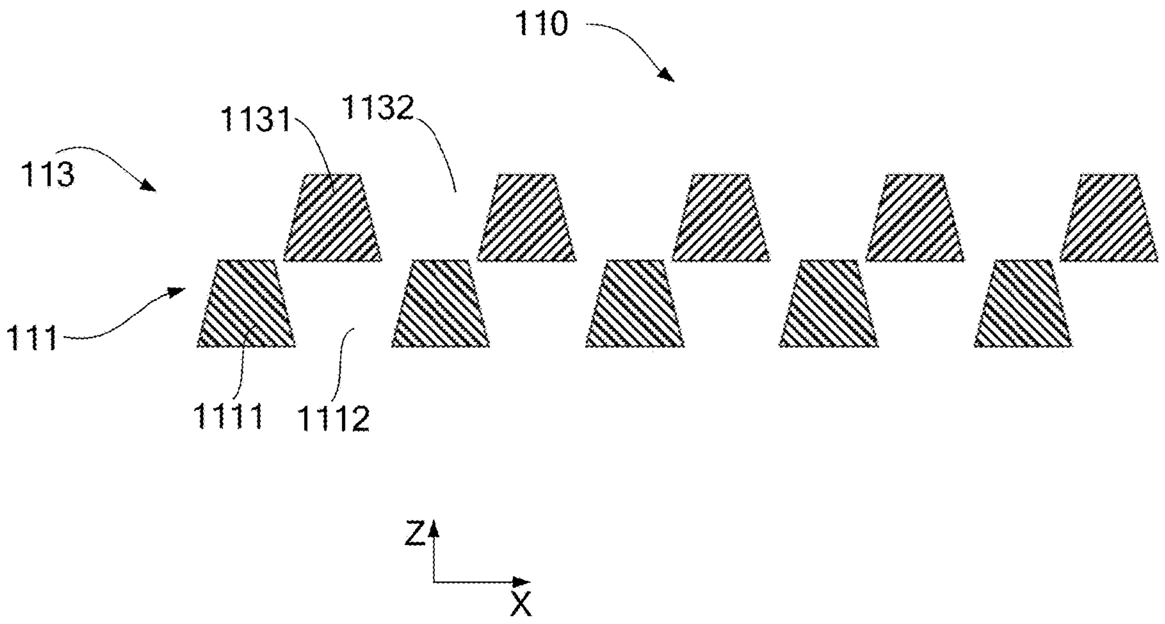
FIG. 10 is a schematic structural diagram of a grating provided in yet another implementation of the present disclosure.

Referring to FIG. 10, FIG. 10 is a schematic structural diagram of a grating provided in yet another implementation of the present disclosure. In this implementation, an orthographic projection of a long base of the first trapezoid on a plane where the long base of the second trapezoid is located at least partially overlaps the long base of the second trapezoid.

Figure 11:
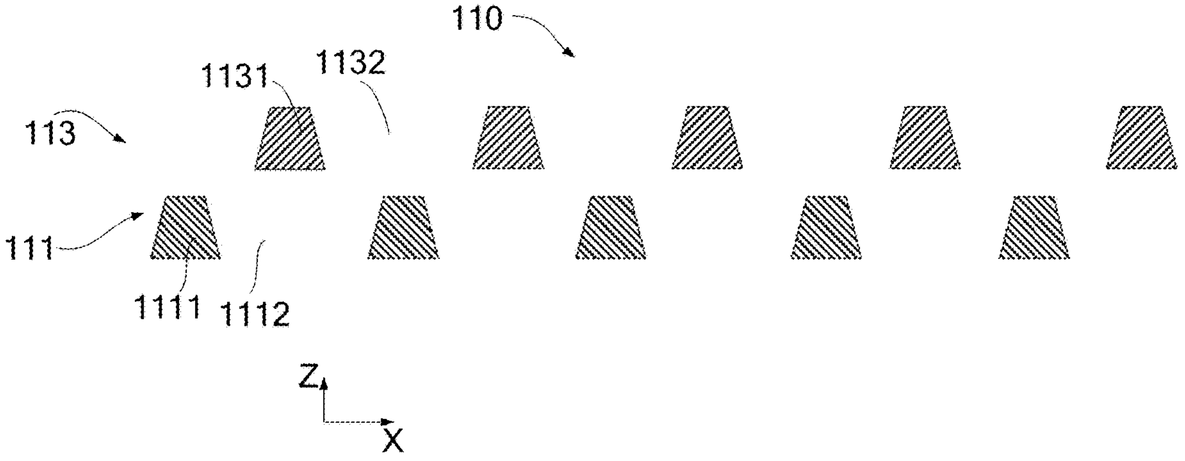
FIG. 11 is a schematic structural diagram of a grating provided in yet another implementation of the present disclosure.

Referring to FIG. 11, FIG. 11 is a schematic structural diagram of a grating provided in yet another implementation of the present disclosure. In this implementation, the orthographic projection of the long base of the first trapezoid on the plane where the long base of the second trapezoid is located is spaced apart from the long base of the second trapezoid.

In FIG. 10 and FIG. 11 and in the grating 110 illustrated in FIG. 10 and FIG. 11, although the effect of coherent subtraction of the first diffracted light and the second diffracted light is not as good as the effect of coherent subtraction of the first diffracted light and the second diffracted light in implementations illustrated in FIG. 9, the rainbow pattern can also be weakened.

Figure 12:
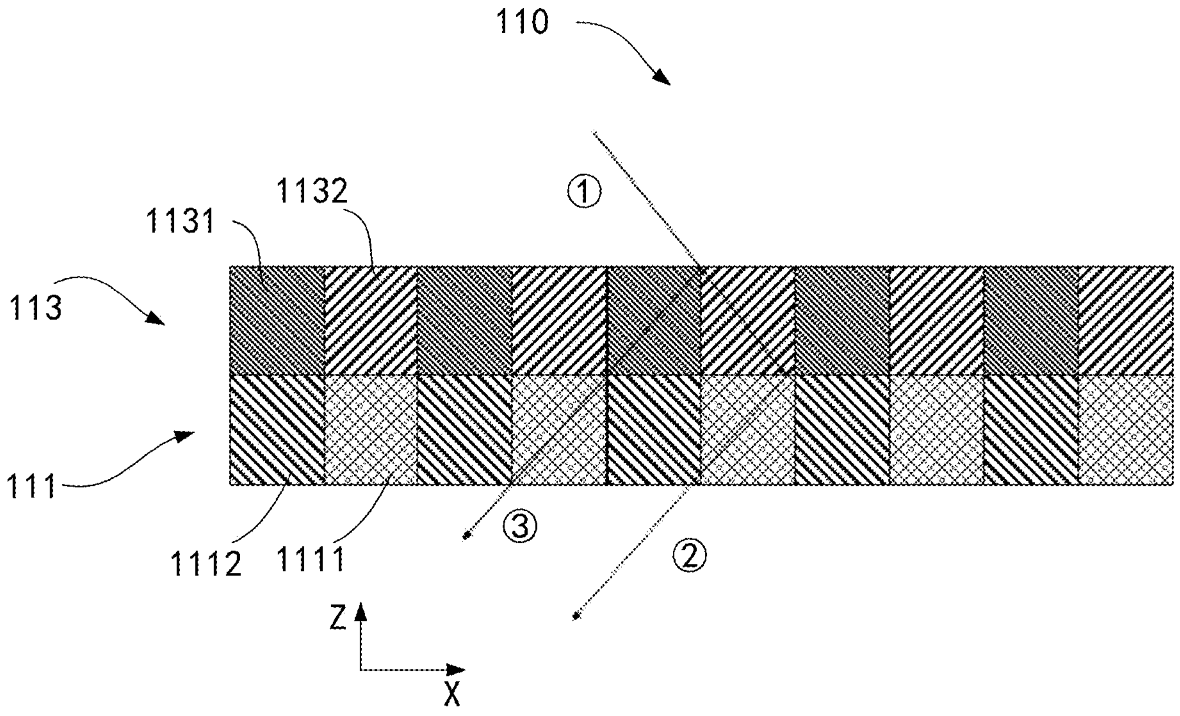
FIG. 12 is a schematic structural diagram of a grating provided in yet another implementation of the present disclosure.

Referring to FIG. 12, FIG. 12 is a schematic structural diagram of a grating provided in yet another implementation of the present disclosure. The first grating layer 111 includes first grating portions 1111 and second grating portions 1112 that are alternately arranged at regular intervals. A refractive index of each of the first grating portions 1111 is greater than a refractive index of each of the second grating portions 1112. A cross-sectional shape of each of the first grating portions 1111 is a first rectangle. The second grating layer 113 includes third grating portions 1131 and fourth grating portions 1132 that are alternately arranged at regular intervals. A refractive index of each of the third grating portions 1131 is greater than a refractive index of each of the fourth grating portions 1132. At least part of each of the third grating portions 1131 is aligned with each of the first grating portions 1111. A cross-sectional shape of each of the third grating portions 1131 is a second rectangle. In other words, different from the above implementations, in this implementation, the cross-sectional shape of the first grating portion 1111 is a rectangle, and the cross-sectional shape of the third grating portion 1131 is a rectangle.

For details about the refractive index of the first grating portion 1111, the refractive index of the second grating portion 1112, the refractive index of the third grating portion 1131, and the refractive index of the fourth grating portion 1132, reference can be made to the above description, which will not be repeated herein. Correspondingly, for details about a material of the first grating portion 1111, a material of the second grating portion 1112, a material of the third grating portion 1131, and a material of the fourth grating portion 1132, reference can be made to the above description, which will not be repeated herein.

For an interval of the first grating layer 111 and an interval of the second grating layer 113, reference can be made to the above description, which will be repeated here.

For a height of the first grating layer 111 and a height of the second grating layer 113, reference can be made to the above description, which will be repeated here.

Similarly, in the schematic diagram in this implementation, light incident to the grating 110 is represented by light ①, the first diffracted light is represented by light ②, and the second diffracted light is represented by light ③.

In this implementation, when the second grating portion 1112 is not air and the fourth grating portion 1132 is not air, that is, when the second light portion is made of a media material and the fourth grating portion 1132 is made of a media material, the first grating layer 111 is attached and fixed to the second grating layer 113, such that the grating 110 has a relatively thin thickness. In other implementations, when at least one of the second grating portion 1112 or the fourth grating portion 1132 is air, and the first grating layer 111 and the second grating layer 113 are fixed to the carrier substrate 115, and are arranged at opposite sides of the carrier substrate 115, the grating 110 forms a relatively stable whole, which facilitates application of the grating 110.

Figure 13:
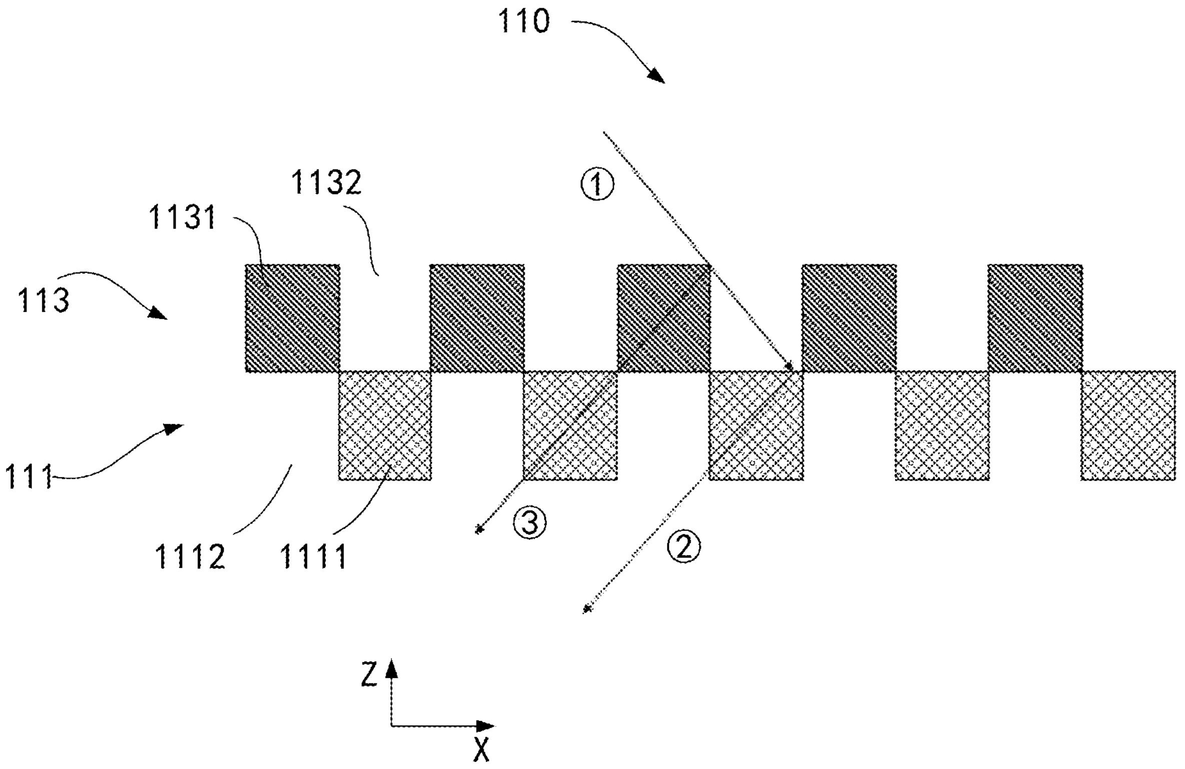
FIG. 13 is a schematic structural diagram of a grating provided in yet another implementation of the present disclosure.

Referring to FIG. 13, FIG. 13 is a schematic structural diagram of a grating provided in yet another implementation of the present disclosure. In this implementation, the second grating portion 1112 and the fourth grating portion 1132 are air. It can be understood that in other implementations, in the grating 110, the second grating portion 1112 is air, and the fourth grating portion 1132 is not air. Alternatively, in other implementations, the second grating portion 1112 is not air, and the fourth grating portion 1132 is air. In other words, at least one of the second grating portion 1112 or the fourth grating portion 1132 is air.

Figure 14:
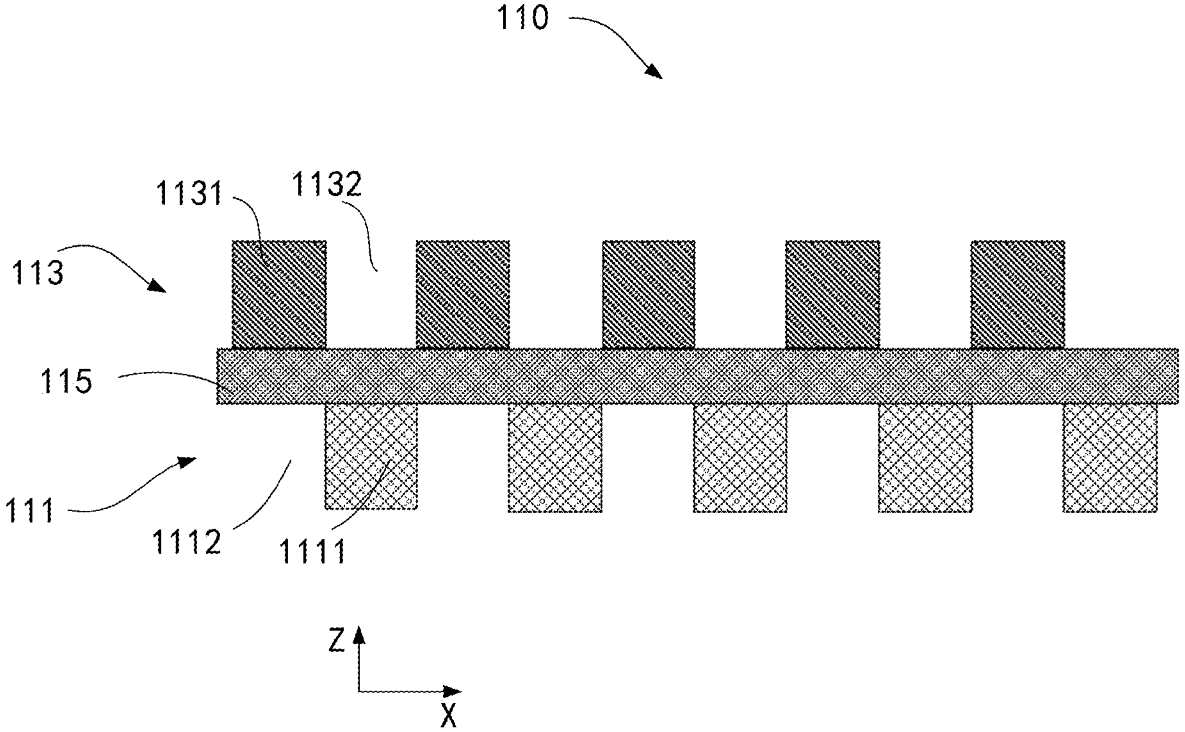
FIG. 14 is a schematic structural diagram of a grating provided in yet another implementation of the present disclosure.

Referring to FIG. 14, FIG. 14 is a schematic structural diagram of a grating provided in yet another implementation of the present disclosure. In this implementation, in addition to the first grating layer 111 and the second grating layer 113, the grating 110 further includes a carrier substrate 115. It can be understood that the carrier substrate 115 is transparent for allowing light to pass through. Please refer to the previous description for the first grating layer 111 and the second grating layer 113, which will not be repeated here. In this implementation, the first grating layer 111 and the second grating layer 113 are fixed to the carrier substrate 115, and are arranged at opposite sides of the carrier substrate 115. When the first grating layer 111 and the second grating layer 113 are fixed to the carrier substrate 115, the second grating portion 1112 may be air or not, and the fourth grating portion 1132 may be air or not. When the second grating portion 1112 is not air and the fourth grating portion 1132 is not air, that is, when the second grating portion 1112 is made of a media material and the fourth grating portion 1132 is made of a media material, the first grating layer 111 is attached and fixed to the second grating layer 113, such that the grating 110 has a relatively thin thickness. When at least one of the second grating portion 1112 or the fourth grating portion 1132 is air, and the first grating layer 111 and the second grating layer 113 are fixed to the carrier substrate 115, and are arranged at opposite sides of the carrier substrate 115, the grating 110 forms a relatively stable whole, which facilitates application of the grating 110. In the schematic diagram in this implementation, for example, the grating 110 further includes the carrier substrate 115, which is combined with implementation illustrated in FIG. 13 to illustrate.

Figure 15:
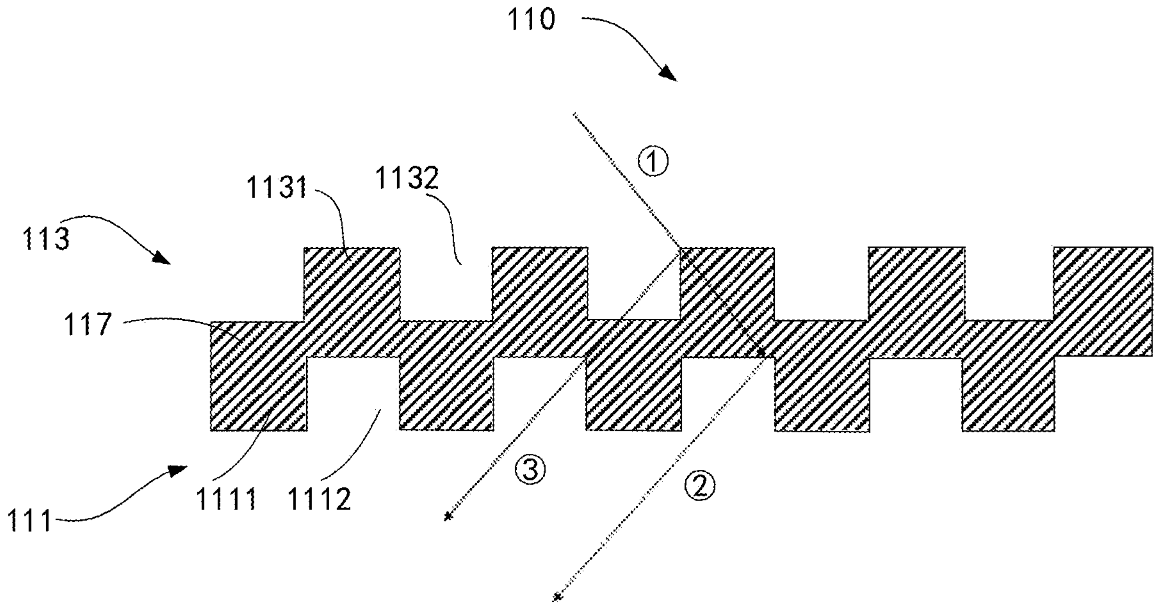
FIG. 15 is a schematic structural diagram of a grating provided in yet another implementation of the present disclosure.

Referring to FIG. 15, FIG. 15 is a schematic structural diagram of a grating in yet another implementation of the present disclosure. The first grating layer 111 includes first grating portions 1111 and second grating portions 1112 that are alternately arranged at regular intervals. A refractive index of each of the first grating portions 1111 is greater than a refractive index of each of the second grating portions 1112. A cross-sectional shape of each of the first grating portions 1111 is a first rectangle. The second grating layer 113 includes third grating portions 1131 and fourth grating portions 1132 that are alternately arranged at regular intervals. A refractive index of each of the third grating portions 1131 is greater than a refractive index of each of the fourth grating portions 1132. At least part of each of the third grating portions 1131 is aligned with each of the first grating portions 1111. In this implementation, the first grating layer 111 is connected to the second grating layer 113 through a connecting layer 117 to form a whole, and the first grating layer 111 and the second grating layer 113 are disposed at two opposite sides of the connecting layer 117. In other words, the first grating layer 111, the second grating layer 113, and the connecting layer 117 are of an integral structure. With the structure of the grating 110 in this implementation, the rainbow pattern is reduced or even eliminated, and a process difficulty during manufacturing of the grating 110 is also reduced.

Further, in this implementation, the first grating portion 1111, the second grating portion 1112, and the connecting layer 117 have identical refractive indexes. In addition, the second grating portion 1112 and the fourth grating portion 1132 are gases. In other words, the first grating layer 111 can be seen to include multiple first grating portions 1111 arranged at intervals, and the second grating layer 113 can be seen to include multiple third grating portions 1131 arranged at intervals. In an implementation, the refractive index of the second grating portion 1112 is identical to the refractive index of the fourth grating portion 1132. In other implementations, the refractive index of the second grating portion 1112 is different from the refractive index of the fourth grating portion 1132. Similarly, in the schematic diagram in this implementation, light incident to the grating 110 is represented by light ①, the first diffracted light is represented by light ②, and the second diffracted light is represented by light ③.

In an implementation, the grating 110 in the various implementations introduced above may be a binary grating 110. When the grating 110 is the binary grating 110, compared to the grating 110 in which the cross-sectional shape of the first grating portion 1111 is the first rectangle and the cross-sectional shape of the third grating portion 1131 is the second rectangle, the grating 110, in which the cross-sectional shape of the first grating portion 1111 is the first trapezoid and the cross-sectional shape of the third grating portion 1131 is the second trapezoid, is easier to be manufactured in actual production and has better machinability.

Figure 16:
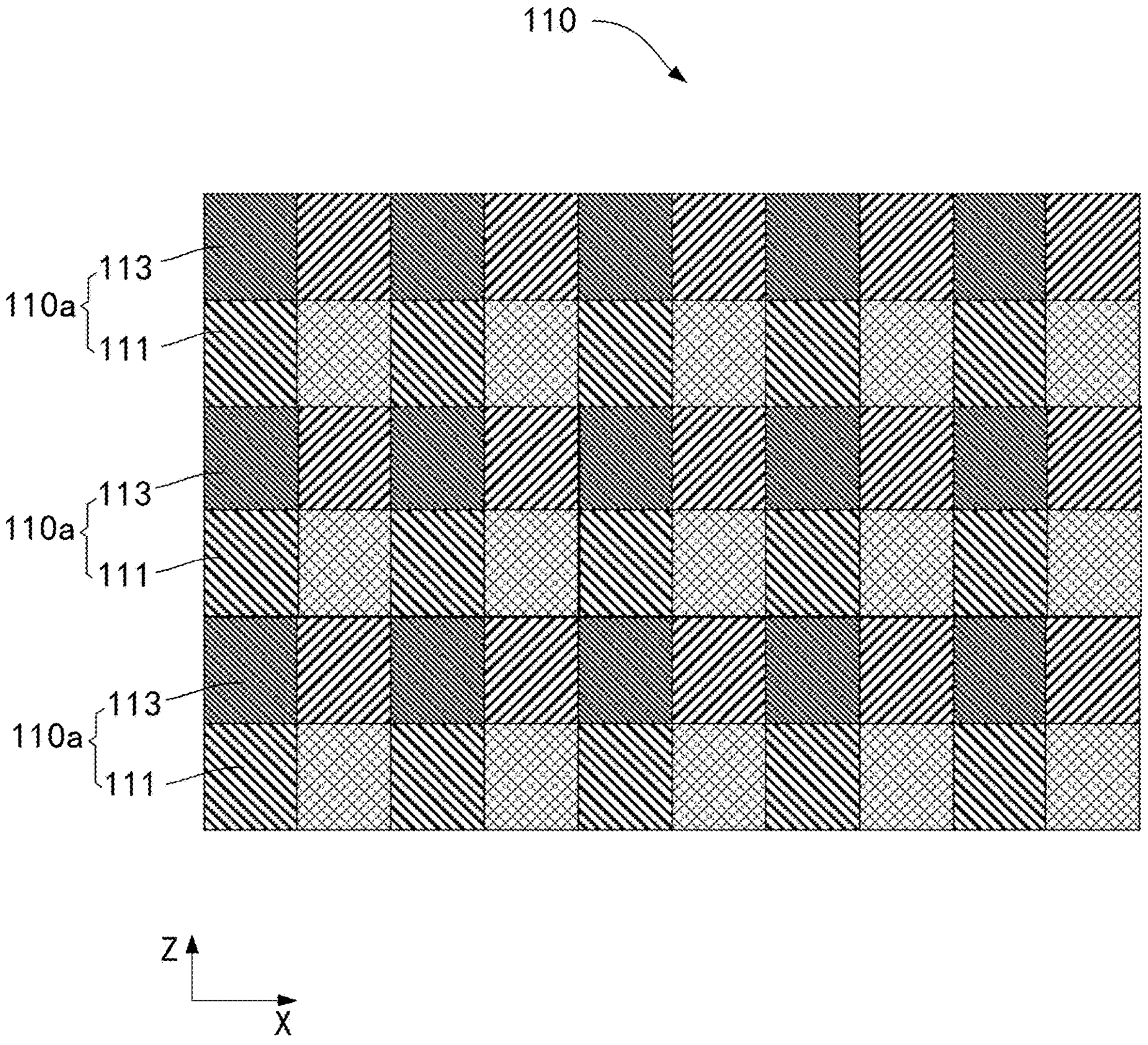
FIG. 16 is a schematic structural diagram of a grating provided in yet another implementation of the present disclosure.

Referring to FIG. 16, FIG. 16 is a schematic structural diagram of a grating provided in yet another implementation of the present disclosure. In this implementation, the grating 110 includes multiple first grating layer 111 and multiple second grating layers 113 that alternately arranged at regular intervals. In other words, the first grating layer 111 and the second grating layer 113 serve as a repeatable grating composite layer 110*a*, and the grating 110 includes multiple grating composite layers 110*a* (three grating composite layers 110*a* are illustrated in the figure). The multiple grating composite layers 110*a* are stacked in a stacked direction of the first grating layer 111 and the second grating layer 113. For example, when the first grating layer 111 and the second grating layer 113 are stacked in direction Z, the multiple grating composite layers 110*a* are stacked in direction Z. For specific arrangement of the first grating layer 111 and the second grating layer 113, reference can be made to the description of any foregoing implementation, which will be repeated here. The specific structure of the first grating layer 111 and the specific structure of the second grating layer 113 in the schematic diagram in this implementation are only schematic, and should not be understood as limitations to the grating 110 provided in implementations of the present disclosure.

Since the grating composite layer 110*a* constituted by the first grating layer 111 and the second grating layer 113 can reduce or even avoid the rainbow pattern, the grating 110 that includes the multiple grating composite layers 110*a* stacked can further weaken the rainbow pattern.

Figure 17:
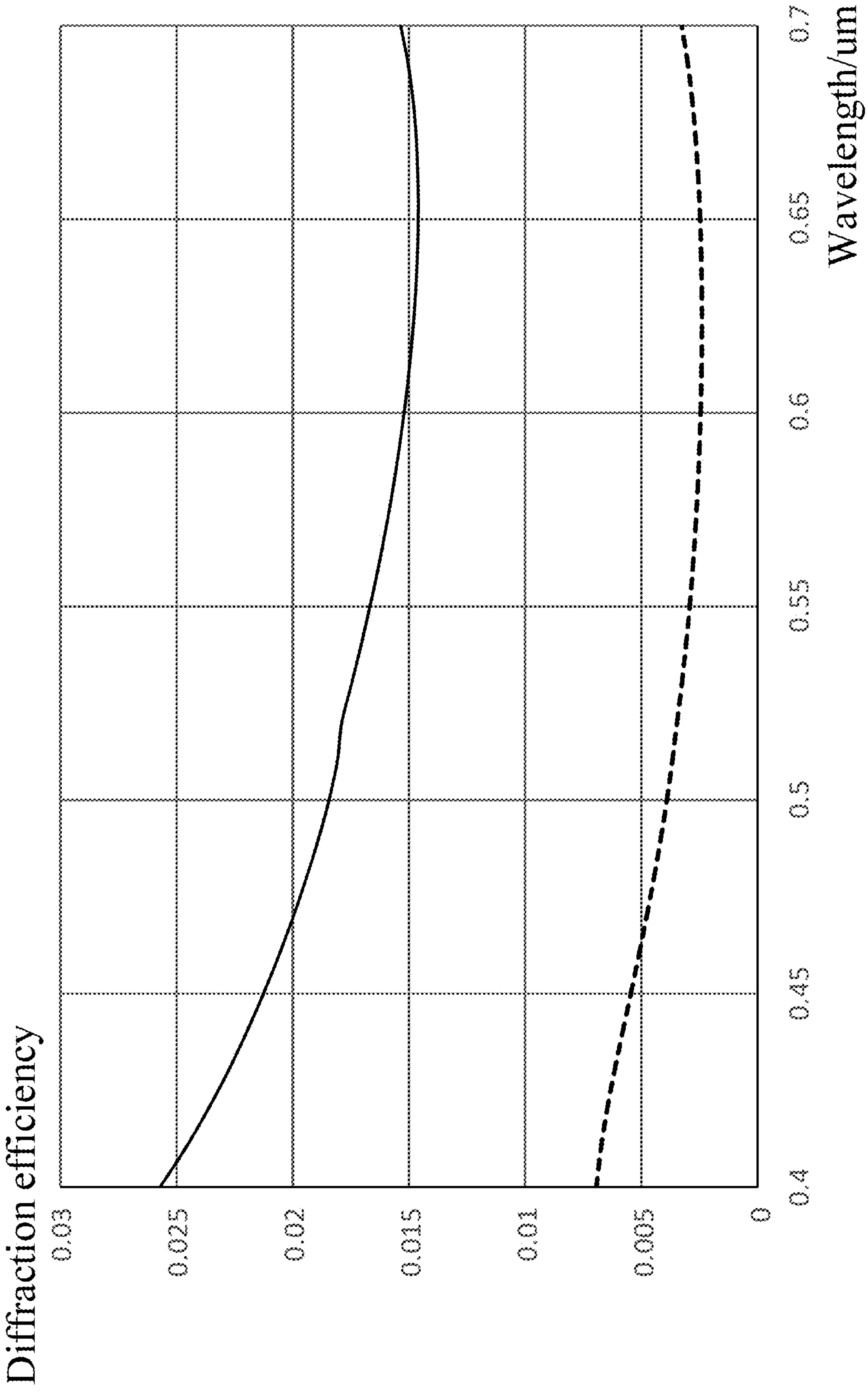
FIG. 17 is a comparison diagram between −1st order diffraction efficiency of a grating provided in an implementation of the present disclosure and −1st order diffraction efficiency of a single-layer grating in the related art.

Referring to FIG. 17, FIG. 17 is a comparison diagram between −1st order diffraction efficiency of a grating provided in an implementation of the present disclosure and −1st order diffraction efficiency of a single-layer grating in the related art. During simulation, the grating 110 in the present disclosure is a double-layer grating including the first grating layer 111 and the second grating layer 113. In the comparison diagram, an abscissa represents wavelength in units of um, and an ordinate represents diffraction efficiency in no unit. In the comparison diagram, a dotted line is a curve of the grating 110 in the present disclosure, and a solid line is a curve of a single-layer grating. It can be seen from the comparison diagram that −1st order diffraction efficiency of the grating 110 in the present disclosure is lower than −1st order diffraction efficiency of the single-layer grating in the related art. Therefore, compared to the single-layer grating in the related art, the grating 110 provided in implementations of the present disclosure can obviously reduce −1st order diffraction efficiency. It can be seen from that an effect of reducing or even avoiding the rainbow pattern by the grating 110 provided in implementations of the present disclosure is relatively obvious.

Figure 18:
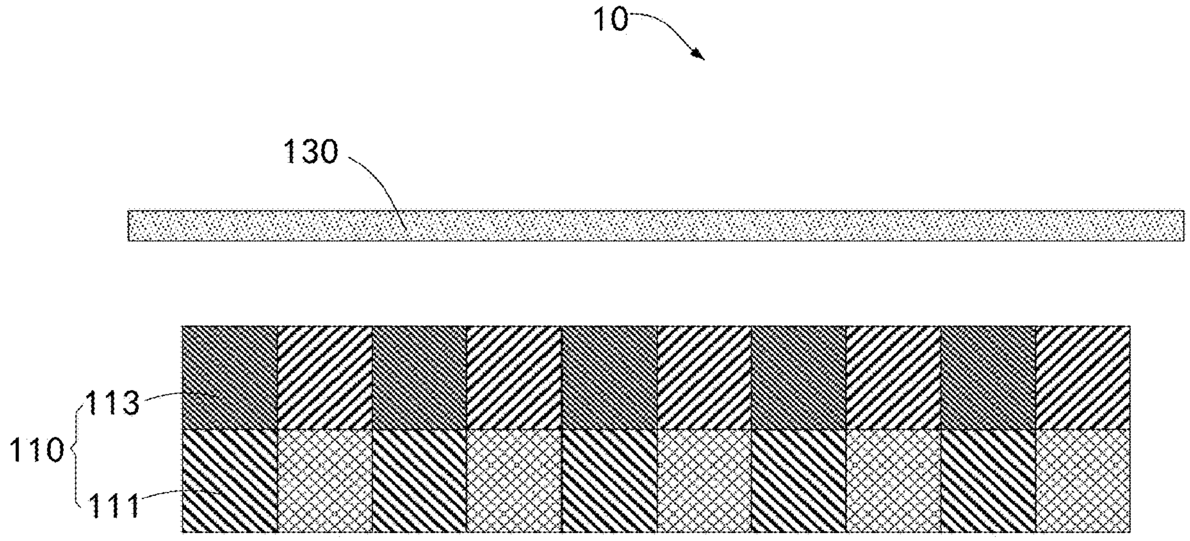
FIG. 18 is a schematic structural diagram of an optical device in an implementation of the present disclosure.
Figure 19:
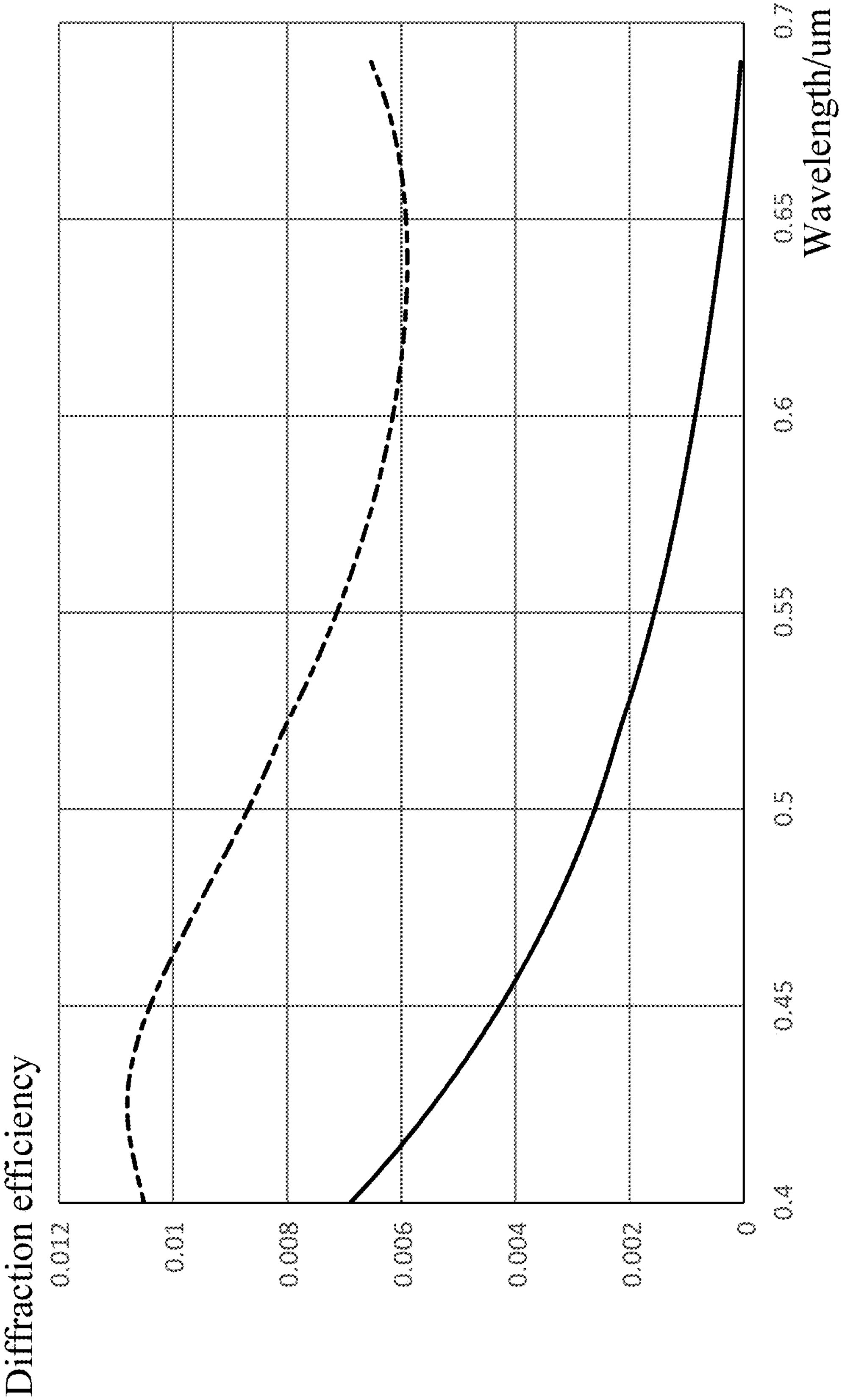
FIG. 19 is a comparison diagram between −1st order diffraction efficiency of a polarizer in a transverse magnetic (TM) polarization state and −1st order diffraction efficiency of a polarizer in a transverse electric (TE) polarization state.

Referring to FIG. 18 and FIG. 19 together, FIG. 18 is a schematic structural diagram of an optical device in an implementation of the present disclosure, and FIG. 19 is a comparison diagram between −1st order diffraction efficiency of a polarizer in a TM polarization state and −1st order diffraction efficiency of a polarizer in a transverse electric (TE) polarization state. An optical device 10 includes a polarizer 130 and the grating 110 in any one of the above implementations. The grating 110 is disposed at one side of the polarizer 130. The first grating layer 111 is farther away from the polarizer 130 than the second grating layer 113. A polarization state of the polarizer 130 is a TM polarization state. The polarizer 130 may be spaced apart from or attached to the grating 110. In FIG. 19, an abscissa represents wavelength in units of um, and an ordinate represents diffraction efficiency in no unit. In FIG. 19, a solid line is a curve of −1st order diffraction efficiency of the polarizer 130 in the TM polarization state, and a dotted line is a curve of −1st order diffraction efficiency of the polarizer 130 in the TE polarization state. It can be seen from the comparison diagram that the −1st order diffraction efficiency of the polarizer 130 in the TM polarization state is less than the −1st order diffraction efficiency of the polarizer 130 in the TE polarization state. Therefore, the polarizer 130 in the TM polarization state is disposed at one side of the grating 110, and the first grating layer 111 is farther away from the polarizer 130 than the second grating layer 113, such that light can firstly pass through the polarizer 130 and then pass through the second grating layer 113 to the first grating layer 111. Therefore, the effect of reducing or even avoiding the rainbow pattern by the optical device 10 provided in implementations of the present disclosure is relatively obvious.

In this implementation, a size of the polarizer 130 is greater than or equal to a size of the grating 110, and an orthographic projection of the grating 110 on the polarizer 130 falls into the polarizer 130.

With the above arrangement of the polarizer 130 in the optical device 10 and the grating 110, the polarizer 130 with a sufficiently large size can act on light before the light enters the grating 110, such that the rainbow effect can be further weakened or even avoided.

Figure 20:
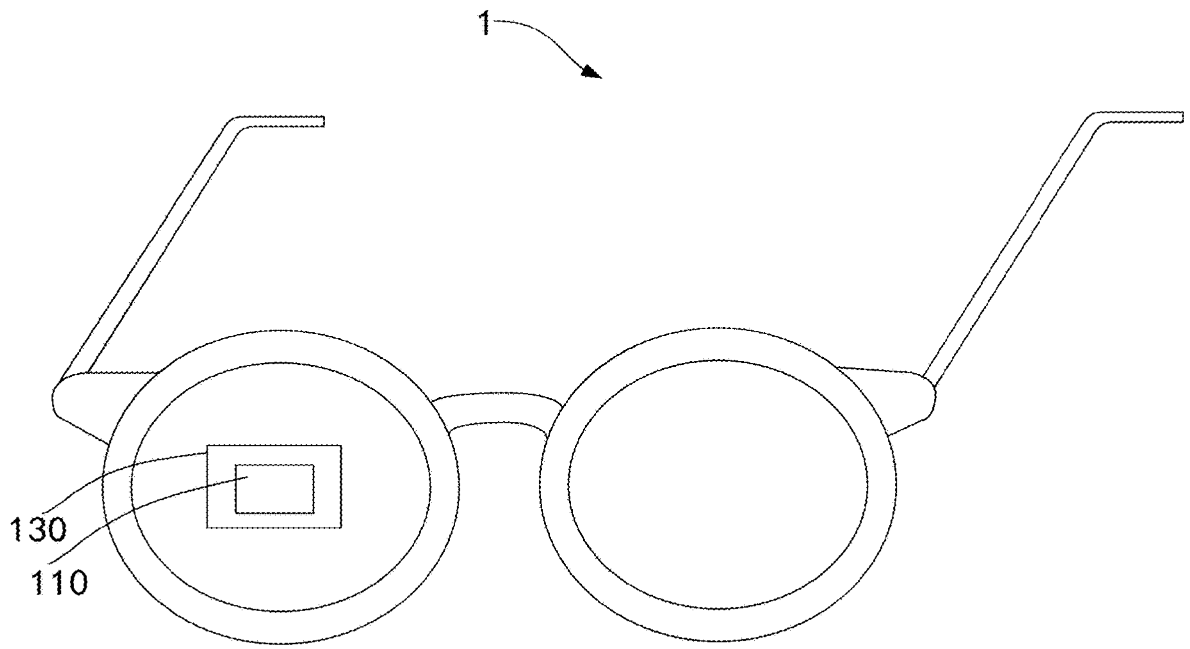
FIG. 20 is a schematic structural diagram of an augmented reality (AR) display device in an implementation of the present disclosure.

Referring to FIG. 20, FIG. 20 is a schematic structural diagram of an AR display device in an implementation of the present disclosure. An AR display device 1 includes the grating 110 in any of the above implementations, or the optical device 10 in any of the above implementations. The grating 110 is an out-coupling grating in the AR display device 1. In other words, the AR display device 1 includes the grating 110, and the AR display device 1 may include the polarizer 130 or not. In the schematic diagram in this implementation, for example, the AR display device 1 includes the polarizer 130 and the grating 110.

When the grating 110 is the out-coupling grating in the AR display device 1, the grating 110 described in each of the above implementations has no influence on normal transmission of external ambient light, and has no obvious influence on performance of a diffractive waveguide of the out-coupling grating included in the AR display device 1.

Figure 21:
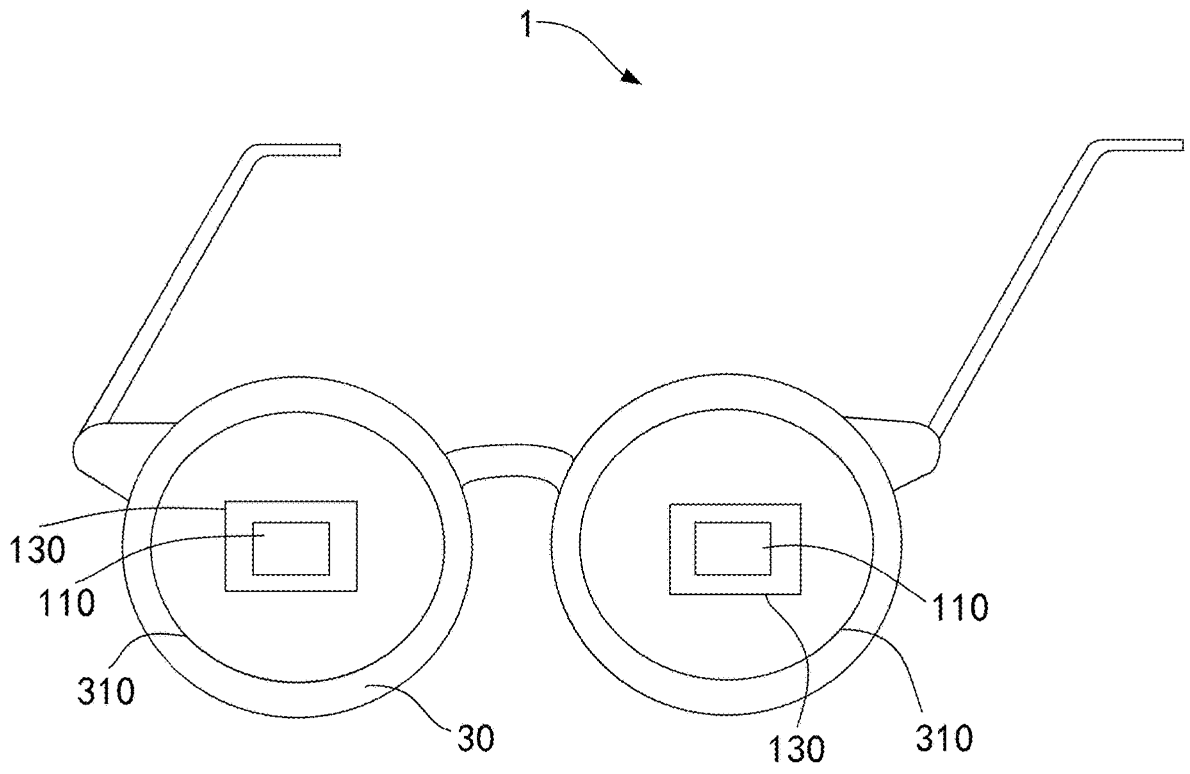
FIG. 21 is a schematic structural diagram of an AR display device in an implementation of the present disclosure.

Referring to FIG. 21, FIG. 21 is a schematic structural diagram of an AR display device in an implementation of the present disclosure. The AR display device 1 may be a pair of AR glasses, and may also be applied to a device having a windshield, such as a vehicle. In the schematic diagram in this implementation, for example, the AR display device 1 is a pair of AR glasses. The AR display device 1 further includes a wearable rim 30. The wearable rim 30 has two window regions 310 spaced apart from each other. The out-coupling grating (i.e., the grating 110) and the polarizer 130 are disposed in at least one window region 310 in the two window regions 310. In the schematic diagram in this implementation, for example, the out-coupling grating is disposed in each of the two windows regions 310. It should be noted that in the schematic diagram in this implementation, a specific morphology of the out-coupling grating is not illustrated, and for the morphology of the out-coupling grating, reference can be made to the grating described in any of the above implementations.

Principles and implementations of the present disclosure are elaborated with specific implementations herein. The above illustration of implementations is only used to help to understand core ideas of the present disclosure. At the same time, for those of ordinary skill in the art, according to ideas of the present disclosure, there will be changes in specific implementations and application scope. In summary, contents of this specification should not be understood as a limitation to the present disclosure.

What is claimed is:

1. A grating, at least comprising:

a first grating layer comprising first grating portions and second grating portions that are alternately arranged at regular intervals, wherein a refractive index of each of the first grating portions is greater than a refractive index of each of the second grating portions, and a cross-sectional shape of each of the first grating portions is a first trapezoid; and a second grating layer disposed at one side of the first grating layer, wherein the second grating layer comprises third grating portions and fourth grating portions that are alternately arranged at regular intervals, a refractive index of each of the third grating portions is greater than a refractive index of each of the fourth grating portions, at least part of each of the third grating portions is aligned with each of the first grating portions, a cross-sectional shape of each of the third grating portions is a second trapezoid, and a long base of the second trapezoid is away from the first grating portions;

wherein the first trapezoid and the second trapezoid each are an isosceles trapezoid, and at least one of an angle between a long base of the first trapezoid and a leg of the first trapezoid or an angle between the long base of the second trapezoid and a leg of the second trapezoid is greater than 80°; and wherein an orthographic projection of a long base of the first trapezoid on a plane where the long base of the second trapezoid is located at least partially overlaps the long base of the second trapezoid; or the orthographic projection of the long base of the first trapezoid on the plane where the long base of the second trapezoid is located is spaced apart from the long base of the second trapezoid.

2. The grating of claim 1, wherein the first grating layer is attached and fixed to the second grating layer.

3. The grating of claim 1, wherein the refractive index of each of the first grating portions ranges from 1.4 to 3.0, and the refractive index of each of the second grating portions ranges from 1.0 to 2.0; and the refractive index of each of the third grating portions ranges from 1.4 to 3.0, and the refractive index of each of the fourth grating portions ranges from 1.0 to 2.0.

4. The grating of claim 3, wherein for each of the second grating portions and each of the fourth grating portions, at least one of the second grating portions or the fourth grating portions is air.

5. The grating of claim 4, further comprising:

a carrier substrate, wherein the first grating layer and the second grating layer are fixed to the carrier substrate, and are arranged at opposite sides of the carrier substrate.

6. The grating of claim 1, wherein an orthographic projection of an endpoint of a long base of the first trapezoid on a plane where the long base of the second trapezoid is located is completely coincident with an endpoint of the long base of the second trapezoid adjacent to the first trapezoid.

7. The grating of claim 1, wherein a height of the first grating layer ranges from 10 nm to 1 um, and a height of the second grating layer ranges from 10 nm to 1 um.

8. The grating of claim 1, wherein an interval of the first grating layer is identical to an interval of the second grating layer, the interval of the first grating layer ranges from 300 nm to 600 nm, and the interval of the second grating layer ranges from 300 nm to 600 nm.

9. The grating of claim 1, comprising a plurality of first grating layers and a plurality of second grating layers that are alternately arranged at regular intervals.

10. An optical device, comprising a polarizer and a grating, wherein the grating is disposed at one side of the polarizer, a first grating layer is farther away from the polarizer than a second grating layer, and a polarization state of the polarizer is a transverse magnetic (TM) polarization state, wherein the grating at least comprises:

a first grating layer comprising first grating portions and second grating portions that are alternately arranged at regular intervals, wherein a refractive index of each of the first grating portions is greater than a refractive index of each of the second grating portions, and a cross-sectional shape of each of the first grating portions is a first trapezoid; and a second grating layer disposed at one side of the first grating layer, wherein the second grating layer comprises third grating portions and fourth grating portions that are alternately arranged at regular intervals, a refractive index of each of the third grating portions is greater than a refractive index of each of the fourth grating portions, at least part of each of the third grating portions is aligned with each of the first grating portions, a cross-sectional shape of each of the third grating portions is a second trapezoid, and a long base of the second trapezoid is away from the first grating portions;

wherein the first trapezoid and the second trapezoid each are an isosceles trapezoid, and at least one of an angle between a long base of the first trapezoid and a leg of the first trapezoid or an angle between the long base of the second trapezoid and a leg of the second trapezoid is greater than 80°, and wherein an orthographic projection of a long base of the first trapezoid on a plane where the long base of the second trapezoid is located at least partially overlaps the long base of the second trapezoid; or the orthographic projection of the long base of the first trapezoid on the plane where the long base of the second trapezoid is located is spaced apart from the long base of the second trapezoid.

11. The optical device of claim 10, wherein a size of the polarizer is greater than or equal to a size of the grating, and an orthographic projection of the grating on the polarizer falls into the polarizer.

12. The optical device of claim 10, wherein an orthographic projection of an endpoint of a long base of the first trapezoid on a plane where the long base of the second trapezoid is located is completely coincident with an endpoint of the long base of the second trapezoid adjacent to the first trapezoid.

13. The optical device of claim 10, wherein an orthographic projection of a long base of the first trapezoid on a plane where the long base of the second trapezoid is located at least partially overlaps the long base of the second trapezoid; or the orthographic projection of the long base of the first trapezoid on the plane where the long base of the second trapezoid is located is spaced apart from the long base of the second trapezoid.

14. The grating of claim 1, wherein a height of the first grating layer is different from a height of the second grating layer.

15. The grating of claim 1, wherein:

the first grating layer is configured to diffract light to obtain first diffracted light; and the second grating layer is configured to diffract the light to obtain second diffracted light, wherein a phase difference P between the second diffracted light and the first diffracted light satisfies: $(2N+1)\pi-\pi/2 \leq P \leq (2N+1)\pi+\pi/2$, wherein $N \geq 0$ and N is an integer.

* * * * *